(12) United States Patent
Ulrich et al.

(10) Patent No.: US 6,434,498 B1
(45) Date of Patent: Aug. 13, 2002

(54) HARD DISC DRIVE VERIFICATION TESTER

(75) Inventors: Scott D. Ulrich, Apple Valley; Cary D. Johnson, Savage; Morse E. Magnuson, Medina, all of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/344,474

(22) Filed: Jun. 25, 1999

Related U.S. Application Data

(60) Provisional application No. 60/090,932, filed on Jun. 26, 1998.

(51) Int. Cl.[7] .......................... G01M 19/00; G06F 19/00
(52) U.S. Cl. .......................... 702/115; 702/121; 714/42
(58) Field of Search .......................... 714/42; 702/115, 702/121, 123, 108; 73/865.9; 324/212

(56) References Cited

U.S. PATENT DOCUMENTS

| | | | | | |
|---|---|---|---|---|---|
| 4,348,761 | A | * | 9/1982 | Berger | 714/718 |
| 4,837,764 | A | * | 6/1989 | Russello | 714/46 |
| 4,944,679 | A | | 7/1990 | Allen et al. | 434/2 |
| 4,949,036 | A | * | 8/1990 | Bezinque et al. | 324/212 |
| 4,967,155 | A | * | 10/1990 | Magnuson | 324/212 |
| 5,390,324 | A | * | 2/1995 | Burckhartt et al. | 714/23 |
| 5,422,890 | A | * | 6/1995 | Klingsporn et al. | 714/723 |
| 5,442,305 | A | * | 8/1995 | Martin et al. | 326/30 |
| 5,644,705 | A | * | 7/1997 | Stanley | 714/42 |
| 5,764,545 | A | | 6/1998 | Cannata et al. | 364/580 |
| 5,835,703 | A | * | 11/1998 | Konno | 714/42 |
| 5,856,624 | A | | 1/1999 | Elsing | 73/865.9 |
| 6,094,973 | A | * | 8/2000 | Novotny | 73/105 |
| 6,169,413 | B1 | * | 1/2001 | Paek et al. | 324/158.1 X |

* cited by examiner

*Primary Examiner*—Thomas P. Noland

(57) ABSTRACT

The invention provides a remotely-operable tester, designed to test multiple disc drives utilizing different interfaces simultaneously. The tester performs tests essentially similar to those performed by the manufacturer, and so is capable of accurately diagnosing disc drive problems without requiring the return of suspected defective disc drives to the manufacturer. Testers are attached to a local computer, which controls operation of the testers and communicates test results via a network connection to one or more other networked computers. The tester is capable of regulating power supplied to the disc drives under test, and of regulating the temperature within the tester. Each bay of the tester may be configured to support a different disc drive interface, and a drive initiator card attached to each bay supports disc drive interface formats needed for the various possible bay configurations.

12 Claims, 4 Drawing Sheets

HARD DISC DRIVE VERIFICATION TESTER

CLAIM OF PRIORITY

This application claims priority from provisional application No. 60/090,932 filed on Jun. 26, 1998.

FIELD OF THE INVENTION

The invention relates generally to a tester for storage devices, and more specifically to an apparatus with self-contained test capability that is operable to test multiple disc drives.

BACKGROUND OF THE INVENTION

Computer systems commonly utilize hard disc drives as a nonvolatile way to store data. A disc drive is favored for such tasks because it has a high capacity for data, is inexpensive relative to many other storage devices, and is relatively fast when compared to other large and inexpensive data storage devices (such as tape drives). Hard drives also are rewritable—data written to a hard drive may be overwritten or erased, unlike many competing data storage media such as Compact Disc-Recordable (CD-R) devices.

Disc drives usually include one or more discs that are rotated, an actuator that moves a transducer to various locations over the disc surface, and electronic circuitry that processes data to be written to the disc surface. The electrical circuitry also includes control circuitry that controls the operation of the disc drive, and passes information between the disc drive transducer and the computer.

The transducer is typically an electromagnetic transducer housed within a small ceramic block. The transducer assembly is passed over the disc as the disc rotates, and is actuated by magnetic patterns stored on the disc. The transducer assembly encounters high air speeds as a result of the spinning disc, and is typically aerodynamically designed so that it flies over the surface of a spinning disc. The distance between a transducer assembly and a spinning disc in operation can be very small, and currently is typically 1–2 microinches. Alternatively, the transducer assembly may pass through a layer of lubricant, traveling at a similar height over the disc surface.

Information representative of the stored data is encoded on the surface of the disc. The transducers, which incorporate read and write heads, read and write the stored information on the disc when the disc head is accurately positioned over a designated track area of the disc. As the disc spins, the transducer is moved to the correct track by a suspension mechanism that supports the transducer above the disc surface. The suspension mechanism also moves the transducer radially, between the inner and outer portions of the disc, to enable reading and writing to multiple tracks on the disc. Because the transducer must be accurately positioned in very close proximity to the disc to read or write information, much research is done on the characteristics of the transducer-disc interface.

The close tolerances necessary in production of state of the art disc drives contribute to occasional disc drive failure. These drive failures may be due to faulty components, to components or assembly that do not meet engineering specifications, or due to wear or other damage that occurs as a result of drive use or abuse. Because many of these failures occur in drives that have been shipped to customers, manufacturers of disc drives often receive shipments of drives suspected of failure from their customers that have been replaced under warranty with new disc drives.

But, because apparent drive failure may be the result of customer misconfiguration or incompatibility as well as actual drive failure, manufacturers of disc drives typically receive a substantial number of returned disc drives that do not have any evident hardware defect. Computer manufacturers usually do not have the capability to thoroughly test returned disc drives, and so replacement drives are shipped to the customer and the presumed defective drives are returned to the manufacturer. For every drive that is returned to the manufacturer that is not faulty, the disc drive manufacturer incurs the expense of providing a replacement drive to the customer via the computer manufacturer in addition to the expense associated with shipping and testing the presumed defective and replacement drives. But, because the equipment needed to thoroughly test disc drives is often specialized, expensive, and complex, it is not usually practical to provide such equipment to even the largest disc drive customers.

What is needed is a testing method and apparatus that will provide economical and efficient testing of returned drives so that only the truly defective drives are returned to the manufacturer.

SUMMARY OF THE INVENTION

The present invention provides an on-site tester, designed to test multiple disc drives at a location remote from the disc drive manufacturer. The tester performs tests essentially similar to those performed by the manufacturer, and so is capable of accurately diagnosing disc drive problems without requiring the return of suspected defective disc drives to the manufacturer.

A tester is attached to a local computer, which controls operation of the tester and communicates test results to other computers, such as through a network connection. The computers in one version of the invention are networked to manufacturer computers that track and record the results of disc drive tests performed at remote locations.

The tester is capable of regulating power supplied to the disc drives under test, and of regulating the temperature within the tester. Each bay of the tester may be configured to support a different disc drive interface, and a drive initiator card attached to each bay supports the disc drive interface formats needed for the various possible bay configurations.

In a version of the invention, a disc drive test apparatus includes a number of bays in a tester which are capable of physically receiving one or more disc drives for testing. The test apparatus also includes one or more drive initiator cards in the tester which physically connect to each bay. The initiator cards can be connected to disc drives to test the disc drives inserted in each bay. A local computer is connected to the tester. The local computer can control the operation of the tester and communicate results of the tests via a network to remote networked computers.

In another version of the invention, a method of testing one or more disc drives is practiced. The method includes the steps of inserting one or more disc drives into one or more bays of a tester and initiating a testing of the one or more disc drives by providing instructions to the tester via a local computer connected to the tester. Results of the tests are provided from the tester to the connected local computer. The results of the tests from the local computer are sent to a remote networked computer.

In another embodiment, a disc drive test apparatus includes bays in a tester capable of physically receiving disc drives for test. Drive initiator cards in the tester are physically connected to each bay and capable of electrically connecting to and communicating with disc drives for test which are inserted in each bay. A controller card is coupled with the drive initiator cards and a local computer. The local computer is connected to the tester. The local computer controls the operation of the tester and communicates results of the tests via a network to remote networked computers.

In yet another version of the invention, a disc drive test apparatus includes a number of bays in a tester that receives disc drives for test. Also included are a number of drive initiator cards in the tester, so that one drive initiator card is physically connected to each bay and is capable of electrically connecting to and communicating with a disc drive inserted in the connected bay for test. A controller card is connected with each of the drive initiator cards and with a local computer. A fan regulates the temperature of the drives under test. A connector provides serial attachment of one or more secondary testers, such that the secondary testers are connected to the tester. A local computer is connected to the tester. The local computer controls the operation of the tester and any secondary testers attached to the tester and communicates results of the tests via a network to remote networked computers.

DESCRIPTION OF THE PREFERRED EMBODIMENT

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

Because disc drive failures often occur after initial verification testing at the manufacturer's facility, these drives must be returned from the field to be tested by either the disc drive manufacturer or the provider of the computer containing the failing disc drive for diagnosis and replacement. But, the tests required to accurately diagnose disc drive failures are complex and require specialized and expensive equipment, and so are not easily performed by most computer manufacturers. This often results in computer manufacturers replacing returned disc drives that are not defective with new disc drives and returning these working disc drives to the manufacturer, causing expense both in replacing a working disc drive and in tracking and shipping disc drives.

The present invention provides a simplified way of performing thorough testing of multiple disc drives at a customer site and providing this data back to the manufacturer, so that disc drives suspected to be defective need not be returned to the manufacturer for testing. Furthermore, the present invention allows rapid evaluation of returned disc drives at a computer manufacturer's site, such that the computer manufacturer can quickly test a returned disc drive and return it to the customer if it is not defective rather than replace the returned disc drive with a new drive.

Figure 1:
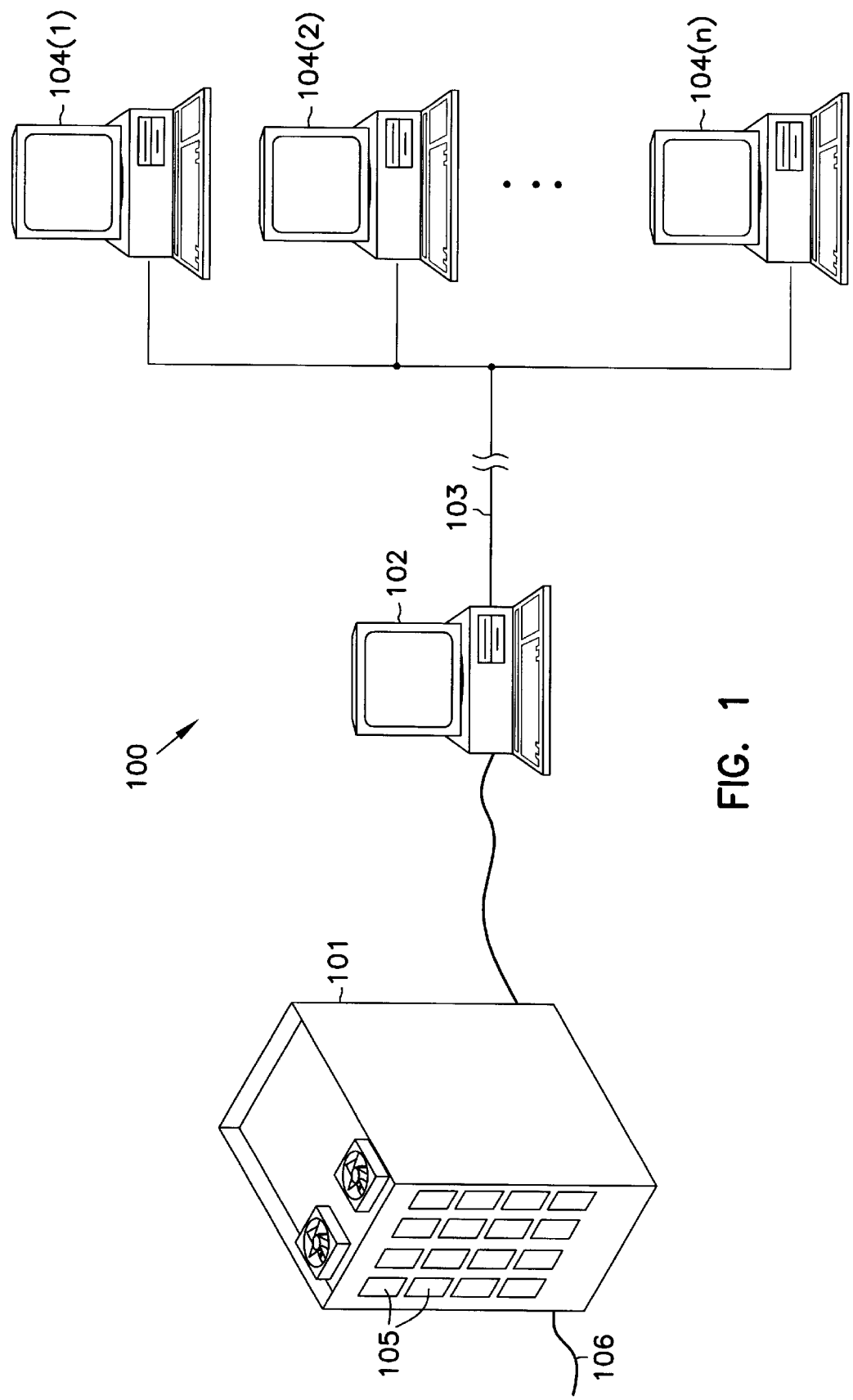
FIG. 1 shows a tester connected to a local computer, which is attached to a network, consistent with an embodiment of the present invention.

Referring to FIG. 1, the on-site verification tester is shown at 101. The tester is connected to a local computer 102, which is connected via a network connection 103 to a remote network of computers 104. The local computer is connected to the tester 101 such that it can control the operation of the tester, and is connected via network connection to the remote network computers 104 such that it can exchange data over the network connection with these networked computers 104. The local computer, tester, and networked remote computer form test apparatus 100. In a further embodiment, connection 106 extends from the tester to a second tester. Serial connection of multiple testers may be done in this manner, such that all serially connected testers are controllable from the local computer 102.

In operation, a computer manufacturer or other customer facility remote from the disc manufacturer operates the tester 101 and the local computer 102. One or more disc drives to be tested are inserted into the bays 105 of the tester 101. Control software is loaded on the local computer and facilitates communication between the local computer 102 and the tester 101. The control software also communicates the results of the test and related information over the network connection 103 to the remote network of computers 104. The network of remote computers 104 are, in one embodiment, computers at a computer manufacturing site that are used to record and analyze drive failure information. The remote computers may also be remote computers of the computer manufacturer or other computers that perform similar data storage or analysis functions.

The tester 101 of one embodiment has within it one or more drive initiator cards that are printed circuit boards with logic that conveys instructions to test the disc drives inserted into the bays 105. The drive initiator cards contain the logic and program that actually provide the test instructions to the disc drives under test, but do so under the direction of the local computer 102. The drive initiator cards also report the results of the test for each drive in each bay to the local computer 102. These results may be stored on the local computer as well as sent via network connection to the remote networked computers. The drive initiator cards in a further embodiment are connected to a tester controller card that manages communication with the local computer 102 and with the individual drive initiator cards. The local computer in a further embodiment controls a power supply for each disc drive under test, such that the power supply voltages applied to the disc drive can be varied during test.

Tests performed by the tester may include any type of test, but will specifically include those tests commonly performed by the disc drive manufacturer for disc drive verification. It is intended that the tester be capable of performing the same tests the disc drive manufacturer would perform if the disc drive were returned to the manufacturer site, but that the tester be operable to perform these tests at a remote customer location. Such tests will include in various embodiments a self-diagnostic test and firmware revision check of the disc drive, read/write tests, disc drive log downloading and evaluation, and read verification of the disc drive as well as other similar tests intended to verify proper operation of a disc drive under test. The test process of a further embodiment will also include downloading new firmware to the disc drive under test if it is determined that the firmware revision on that disc drive requires updating.

Figure 2:
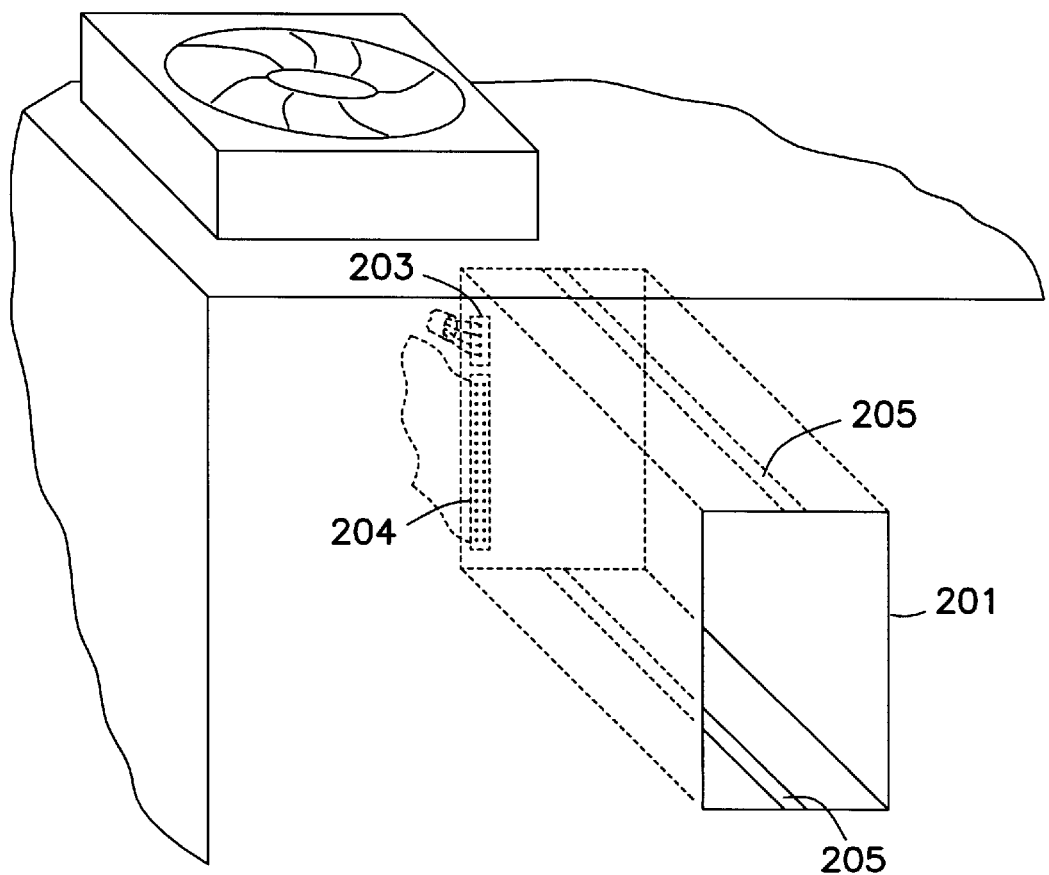
FIG. 2 shows a bay within a tester, consistent with an embodiment of the present invention.

Each bay 105 can hold an individual disc drive, and each bay may be used to test a disc drive simultaneously. The bays of the tester are designed to hold drives under test in a manner which meets or exceeds the drive product specifications for rotational vibration. The bays and tester are further physically designed to support the disc drives in a manner that substantially reduces the effects of external physical excitation, and meets any other physical mounting specifications of the disc drives to be tested. A more detailed view of a bay of one embodiment is shown in FIG. 2. In FIG. 2, only one bay 201 is shown in the tester 202 for the purpose of clarity. The bay comprises a physical opening in the tester, into which a disc drive can be physically inserted and electrically connected to the drive initiator card and to a power supply. In one embodiment, a separate drive initiator card is attached to each bay and controls a disc drive inserted in that bay. The bay includes a power connector 203 and a drive interface connector 204, that are positioned in the bay such that they mate with a corresponding power connector and interface connector on a disc drive inserted into the bay. The power connector 203 is attached to a power supply, and the drive interface connector 204 is attached to the drive initiator card.

In a further embodiment, the power connector may be attached to a power supply controlled by the tester controller card, such that the tester controller card controls the power-up and voltage provided to the disc drive. Such an embodiment is useful to monitor drive characteristics during disc drive power-up, and also allows repeated power-up cycles to be performed in a single test of the disc drive. It also allows variation of the voltages supplied to the disc drive under test, to characterize the disc drive's ability to operate with voltages that vary from an ideal voltage.

Each drive interface connector 204 must be of a specific type and geometry to interface with a specific type of disc drive. First, the physical alignment and position of the power connector 203 and the drive interface connector 204 must correspond to the alignment of the corresponding connectors on the disc drive inserted in the bay 201. The drive must be supported in the bay by alignment guides 205 or by a similar mounting apparatus to align the corresponding connectors on insertion of the drive into the bay. Second, the connectors 203 and 204 must be of the same type in the tester bay and on the disc drive. The power connector 203 is of a standard type, but may be vary in some embodiments if needed to interface with new or specialized disc drive devices. But, a variety of formats for drive interface connectors 204 already exist and are widely used, and must be distinguished between in designing a tester.

Three types of Small Computer System Interface (SCSI) connector are currently in use, and are not physically compatible. For example, the various connectors contain 50 pins in some SCSI-I and SCSI-II variations, contain 68 pins in all Wide SCSI variations, and contain 80 pins in the Single Connector Attachment (SCA) SCSI variation. Because a 68-pin connector will not interface with an 80-pin or 50-pin connector, each specific connector type must be matched to the disc drive used in that bay. Also, the SCA SCSI interface incorporates power connections in the drive interface connection 204, and so no separate power connector 203 is necessary. Further, Low-Voltage Differential (LVD) variations of SCSI exist, and LVD SCSI must be supported by the drive initiator card interface to each bay that will be used to test LVD SCSI disc drives.

Additionally, Integrated Drive Electronics (IDE) or AT Attachment (ATA) drives communicate via a 40-pin drive interface connector, and use a communications standard very different in nature from SCSI. These IDE drives also require a standard power connection to supply power to the drive, in addition to the interface connection. IDE drives are typically not used in high-end disc drive applications, and so are less likely to be supported in a tester configuration than SCSI variations. However, Fiber Channel SCA attachments are in commercial use for high-end disc drives, and rely on a single unique 40-pin connector to convey both data and power to the disc drive. It is anticipated that most testers consistent with this invention will have bays configured to receive and test Fibre Channel disc drives. Future high-performance disc drive attachments and protocols may be developed, and are also to be considered as bay configuration options consistent with the present invention.

Each bay therefore must be configured to support one of these many types of physical connectors, and is therefore physically capable of receiving only disc drives that have corresponding connectors. But, a single tester 202 typically will contain multiple bays, and each bay can be independently configured to support any of these different connectors and therefore support a number of different drive types.

The drive initiator card attached to each bay must support all interfaces and communication protocols necessary to communicate with the different drive types supported by the different bays in a single tester. For example, a single tester may support a mix of 50-pin SCSI, 68-pin SCSI and 80-pin SCA SCSI as well as 40-pin SCA Fiber Channel disc drives, and must have appropriate drive initiator card programming to support and test each of these types of drives in their respective bays. A preferred embodiment of the tester anticipated for production will be configured to support a combination of SCSI and Fiver Channel disc drives in various bays of the tester.

In a further embodiment a connection is made between the local computer and the disc drive under test. This connection provides for communication for controlling selected tests and for other functions, and is made between the local computer and a selected disc drive via a controller card comprising part of the tester. The connection of one embodiment can further be employed to program a memory that comprises part of the disc drive under test, and to read or write other data to the disc drive. In one embodiment, the connection is a serial connection between the local computer and the drive under test, and is established via the controller card in the tester.

Figure 3:
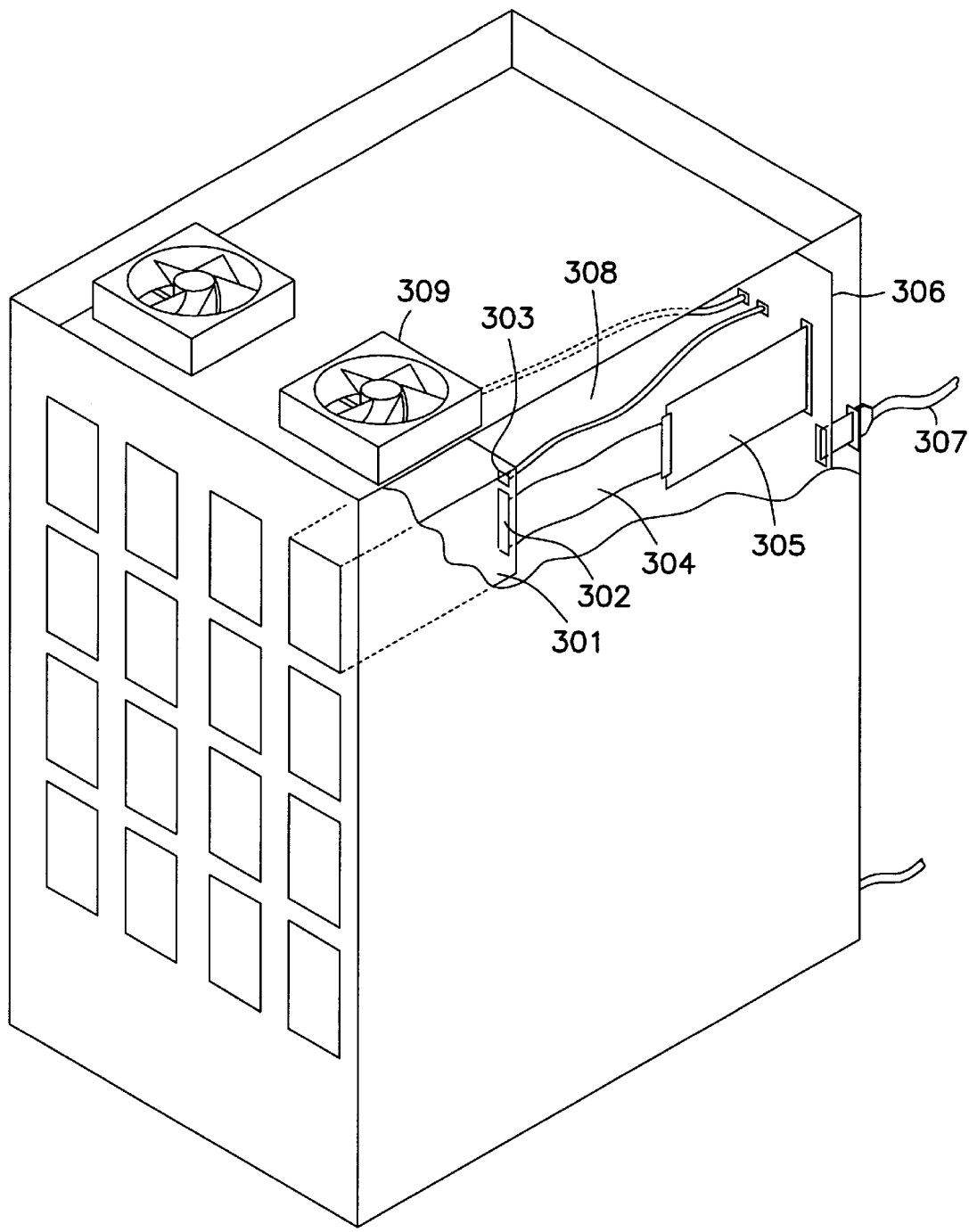
FIG. 3 shows a side view of a tester, consistent with an embodiment of the present invention.

FIG. 3 shows a side view of a tester, and illustrates several components of one embodiment of the tester. A bay 301 has a drive interface connector 302 and a power connector 303 physically mounted in the bay in position to mate with corresponding connectors of a disc drive inserted in the bay. The drive interface connector 302 is electrically connected by cable 304 to drive initiator card 305, or in an alternate embodiment is directly connected to an initiator card 305. The initiator card 305 is electrically connected to tester controller card 306, which is connected via I/O cable 307 to the local computer. In a further embodiment, multiple testers may be connected to a single I/O connection on the local computer, such as by daisy-chain cable connection of multiple testers. Instructions from the local computer are sent to the controller 306 via cable 307, and the controller in turn instructs the initiator card 305 to send appropriate commands to the disc drive under test in the bay 301 associated with the initiator card.

Power supply connector 303 is connected to a power source via cable 308, which is attached to a power controller.

The power controller in one embodiment is a programmable power supply that can be programmed to supply varying voltages to the power connector 303 during testing of a disc drive. This power controller may be a part of the controller card 306 as shown in FIG. 3, or may be any other controller programmable by the local computer or the controller card to vary the supplied voltage during test. The power controller in a further embodiment is operable to conduct a four-corner margins power test comprising providing a five-volt and a twelve-volt supply, each of which are varied across the entire product specification for allowable voltage for the drive under test. For example, many drives specify that power supplied must vary by no more than plus or minus five percent of ideal voltage. Because there are four possible combinations of voltages in such a plus-minus test with two voltage supplies, a test of all four combinations is known as a four-corner margins test.

In a further embodiment, one or more fans 309 are mounted on the controller, and provide cooling to the disc drives under test as well as to the other components of the tester. The fans are controlled by the tester controller card 306 to regulate the temperature of the tester during test, via one or more temperature sensors located in the tester. The fans are controlled to regulate airflow and temperature, to ensure that the disc drives under test are operating under desired thermal conditions.

Another embodiment of the present invention provides a tester as described herein, but lacking a controller card and having only one bay. Such a single-bay tester does require a controller card to facilitate communication between multiple drives and the local computer, but instead incorporates a drive initiator card capable of communication with the local computer. This tester is particularly well suited for field service, due to the reduced size of a tester that supports only one disc drive. A further embodiment of the tester has no bay but still electronically supports a single disc drive, simply providing an electrical connection from which a cable can be connected between the tester and a disc drive to be tested. This allows testing of a disc drive still mounted in a system or on a table top, and further improves size and portability of such a tester intended for field use. The tester in one embodiment will have an initiator card that supports SCSI disc drives and an initiator card that supports Fiber Channel disc drives, so that the tester is capable of testing all current high-end disc drive products of the manufacturer. It is anticipated that new disc drive interface formats will be developed, and incorporation of support for these formats into a tester as described herein is to be considered within the scope of this invention. The tester is attachable and controllable via a laptop or other local computer, facilitating portability and use of the tester in remote or field locations.

Figure 4:
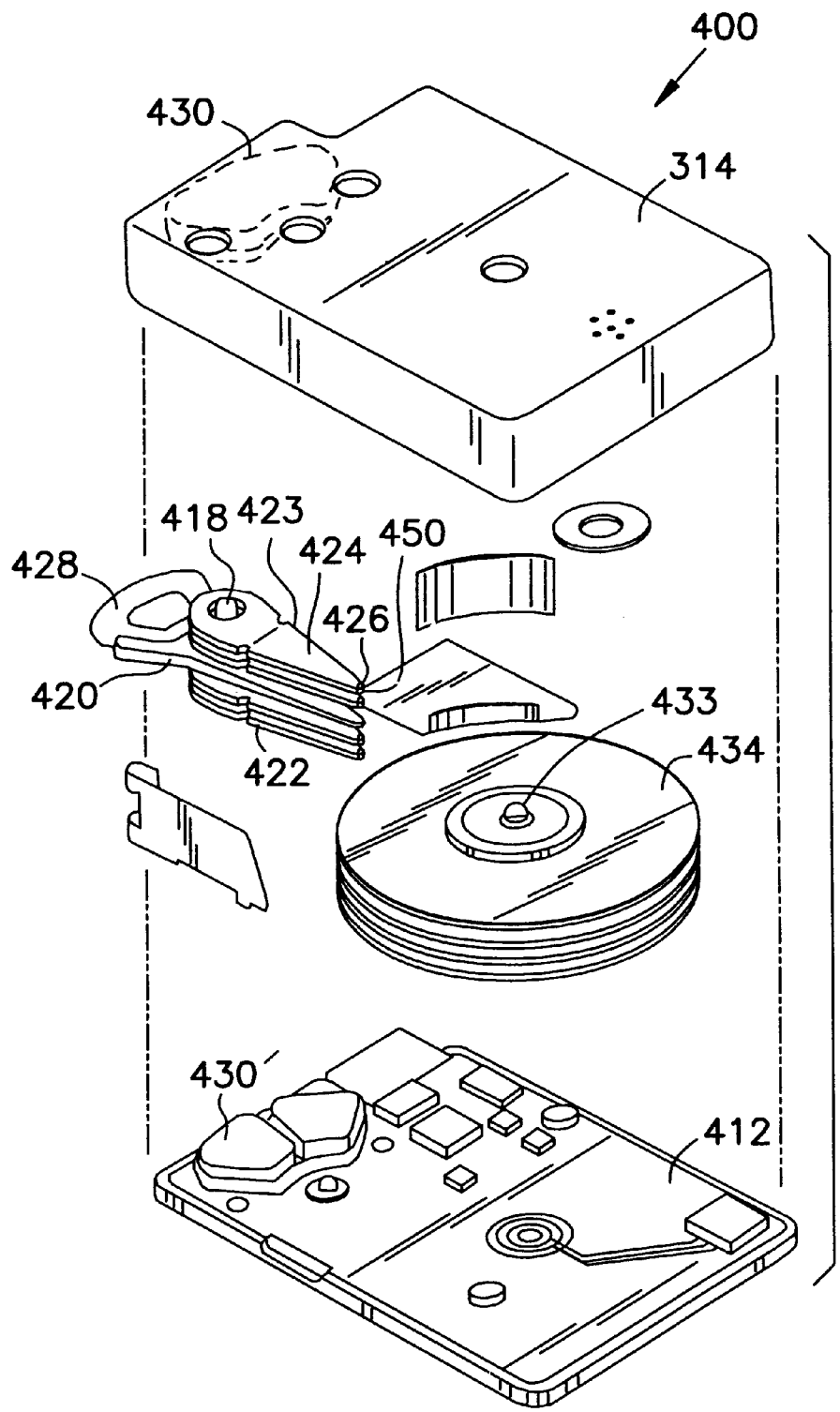
FIG. 4 shows a disc drive assembly, as may be tested by the present invention.

The invention described herein is operable to test one or more disc drives, as illustrated at 400 in FIG. 4. This exemplary drive has a housing or base 412 and a cover 414 that form a disc enclosure. An actuator assembly 420 is attached to base 412 and pivots about actuator shaft 418. The actuator assembly includes a plurality of combs 422 onto which arms 423 with load beans 424 are mounted. These load springs each support a slider 426 that carries a magnetic transducer 450, which in combination are often known as a head. A voice coil 428 is located on the actuator assembly opposite from the head, and along with voice coil magnets 430 forms a motor that actuates the actuator assembly about the actuator shaft 418. A spindle motor is also mounted to the base 412, and comprises in part a rotating spindle hub 433. In this particular embodiment, the spindle motor is located within the spindle hub, and so is not visible. The spindle hub supports and rotates a number of discs 134, onto which data is stored and read.

The present invention provides a remotely-operable tester, designed to test multiple disc drives utilizing different interfaces simultaneously. The tester performs tests essentially similar to those performed by the manufacturer, and so is capable of accurately diagnosing disc drive problems without requiring the return of suspected defective disc drives to the manufacturer. One or more testers are attached to a local computer, which controls operation of the tester and communicates test results via a network connection to one or more other networked computers. The tester is capable of regulating power supplied to the disc drives under test, and of regulating the temperature within the tester. Each bay of the tester may be configured to support a different disc drive interface, and a drive initiator card attached to each bay supports disc drive interface formats needed for the various possible bay configurations.

CONCLUSION

In one embodiment, a disc drive test apparatus 100 includes a plurality of bays 105 in a tester 101. The tester 101 is capable of physically receiving one or more disc drives for testing. The test apparatus 100 also includes one or more drive initiator cards 305 in the tester which physically connect to each bay. The initiator cards are capable of connecting to disc drives to test the disc drives inserted in each bay. A local computer 102 is connected to the tester. The local computer is operable to control the operation of the tester and to communicate results of the tests via a network connection 103 to remote networked computers 104. The tester may be attached to one or more other testers via a connection 106, such that all coupled testers are controllable from the connected local computer 102. Each bay 105 of the tester is individually configurable to physically receive and electrically communicate with a plurality of types of disc drives. The drive initiator cards 305 are operable to execute machine readable instructions that perform one or more tests on the one or more connected disc drives. A programmable power supply is connected to the one or more disc drives under test and operable to vary voltage supplied to the one or more connected disc drives. The programmable power supply can perform a 4-corner margins test on the one or more disc drives under test. Each bay 301 of the tester may be electrically connected to a drive initiator card 305 dedicated to that bay. The tester can test disc drives inserted in bays of the tester when one or more bays are empty. The test apparatus also has at least one fan 309 operable to regulate the airflow and temperature of the tester.

In another embodiment, a method of testing one or more disc drives is disclosed. The method includes the steps of inserting one or more disc drives into one or more bays 105 of a tester 101 and initiating testing of the one or more disc drives by providing instructions to the tester via a local computer 102 coupled to the tester. Results of the tests are provided from the tester to the coupled local computer. The results of the tests from the local computer are sent to a remote networked computer 104. The tester may also be connected to one or more other testers via a connection 106, such that the local computer communicates with the other testers and the other testers are operable to provide test results to the local computer 102. Another step in the method may be to individually configure each bay 105 to physically and electronically support any type of disc drive. The method further includes controlling a programmable power supply connected to one or more disc drives under test to provide a desired voltage to the one or more disc drives. The method may also include controlling a programmable power supply to conduct a four-corners test on one or more disc drives under test. The temperature of the tester may be regulated by controlling the operation at least one fan 309 comprising part of the tester.

In another embodiment, a disc drive test apparatus includes a plurality of bays in a tester. The tester is capable of physically receiving disc drives for test. Drive initiator cards in the tester are physically connected to each bay and capable of electrically connecting to and communicating with disc drives for test which are inserted in each bay. A controller card is coupled with the drive initiator cards and a local computer. The local computer is connected to the tester. The local computer controls the operation of the tester and communicates results of the tests via a network to remote networked computers. The tester is attachable to one or more other testers. All coupled testers are controllable by the connected local computer. The tester is individually configurable to physically receive and electrically communicate with any type of disc drive.

In yet another embodiment, a disc drive test apparatus includes a plurality of bays 105 in a tester 101 capable of physically receiving disc drives for test. Also included are a plurality of drive initiator cards 305 in the tester, such that one drive initiator card is physically connected to each bay and is capable of electrically connecting to and communicating with a disc drive inserted in the connected bay for test. A controller card 306 is connected to each of the drive initiator cards and with a local computer 102. A fan 309 regulates the temperature of the tester. A connection 106 provides serial attachment of one or more secondary testers, such that the secondary testers are connected to the tester. A local computer 102 is connected to the tester. The local computer controls the operation of the tester 101 and any secondary testers attached to the tester and communicates results of the tests via a network 103 to remote networked computers 104.

In conclusion, several embodiments of the invention are discussed. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

What is claimed is:

1. A disc drive test apparatus, comprising:
    a tester;
    a plurality of bays within the tester, each bay capable of physically receiving disc drives for test;
    a drive initiator card corresponding to each bay, the drive initiator cards operatively connected to disc drives for test inserted in each bay; and
    a local computer connected to the tester, the local computer operable to control the operation of the tester and to communicate results of the tests to remote computers.

2. The test apparatus of claim 1, wherein the tester is communicatively coupled to one or more other testers, the coupled testers controllable from the connected local computer.

3. The test apparatus of claim 1, wherein each bay of the tester is individually configurable to physically receive and electrically communicate with one of a plurality of types of disc drive.

4. The test apparatus of claim 1, wherein each bay of the tester is designed to meet the physical mounting specifications of the disc drive to be inserted in the bay for test.

5. The test apparatus of claim 1, wherein the one or more drive initiator cards execute machine readable instructions that perform one or more tests on the one or more connected disc drives.

6. The test apparatus of claim 1, further comprising a programmable power supply connected to the one or more disc drives under test and operable to vary voltage supplied to the one or more connected disc drives.

7. The test apparatus of claim 6, wherein the programmable power supply is directed to perform a 4-corner margins test on the one or more disc drives under test.

8. The test apparatus of claim 1, wherein the local computer communicates results of the tests to remote computers via a network.

9. The test apparatus of claim 1, wherein the tester is operable to test a disc drives inserted in a bays in the tester where at least one bay is empty.

10. The test apparatus of claim 1, further comprising a connection between the local computer and the disc drives for test operable to provide communication between the local computer and the disc drives.

11. The test apparatus of claim 1, further comprising one or more fans operable to regulate the airflow and temperature of the tester.

12. The test apparatus of claim 1, further comprising means for transferring test results to a remote computer.

* * * * *